W. H. KUNZ.
MOVABLE CHROMATIC CORRECTOR.
APPLICATION FILED OCT. 22, 1914.
1,175,961.
Patented Mar. 21, 1916.
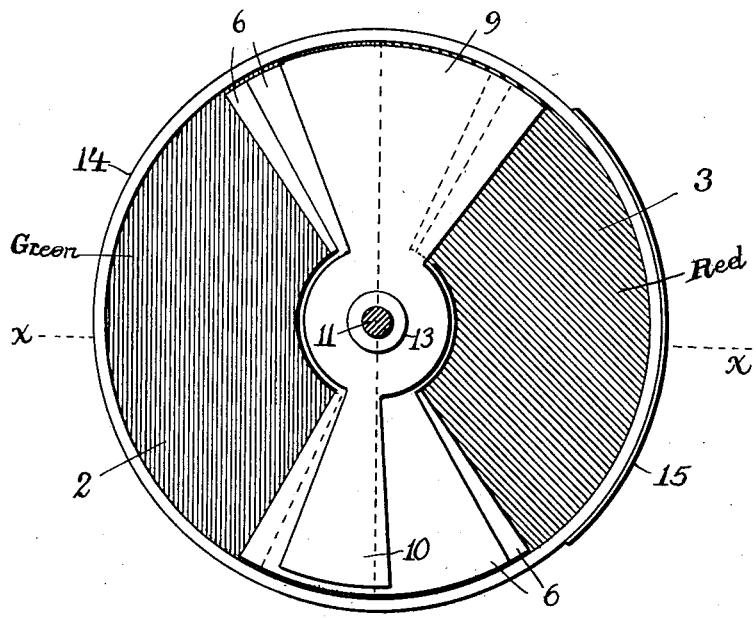
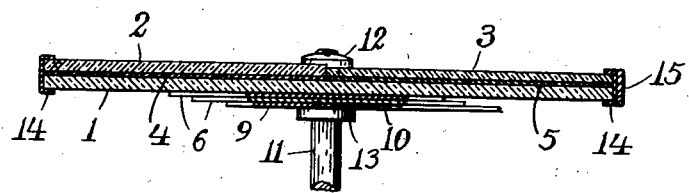
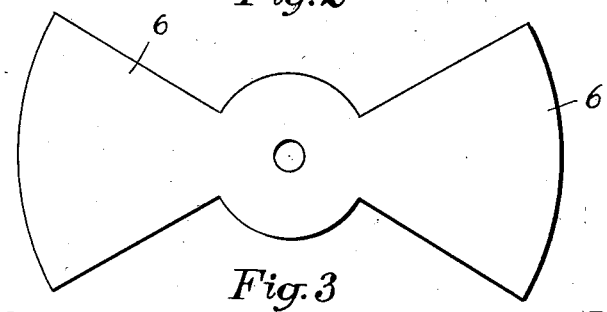
Witnesses;
A. S. Moffat
Gilbert R. Elliott
Inventor,
William H. Kunz;
By A. B. Upham,
Attorney.

UNITED STATES PATENT OFFICE.

WILLIAM H. KUNZ, OF BOSTON, MASSACHUSETTS, ASSIGNOR TO KUNZ-GARNISS COMPANY, A CORPORATION OF MASSACHUSETTS.

MOVABLE CHROMATIC CORRECTOR.

1,175,961.  Specification of Letters Patent.  Patented Mar. 21, 1916.

Application filed October 22, 1914. Serial No. 868,133.

*To all whom it may concern:*

Be it known that I, WILLIAM H. KUNZ, a citizen of the United States, and a resident of the city of Boston, in the county of Suffolk and Commonwealth of Massachusetts, have invented certain new and useful Improvements in Movable Chromatic Correctors, of which the following is a full, clear, and exact specification.

This invention relates to that method of taking and projecting moving pictures in two colors, wherein alternate pictures are taken through alternating color-filters, and are thrown upon the screen through similarly alternating color-filters. In other words, one photograph on the film is taken through a green filter, the second through a red color filter, the next through the green filter again, and so on alternating throughout the length of the film. In the same manner, the projection is made through similarly alternating green and red color filters, so that the effect upon the screen is a moving picture substantially in the colors of nature.

Because of the increased light-absorption caused by the passage of the light through the color-filters, and for other reasons, two-color pictures require from fifteen to thirty times as much light as ordinary black and white pictures, thus necessitating extremely high speed lenses. Such extreme speed lenses have not yet been made that will form images by red and green light that will be of the same size, and it has heretofore been necessary to use the slower lenses which can be corrected to prevent color-refraction. It is the purpose of this invention to provide a means of overcoming this chromatic defect in the fast lenses and thus permitting their use in color work.

A further object is the construction of means for adjustable varying and equalizing the amounts of lights through the two color-filters in order to make up for the lesser actinic power of the rays passing through one color-filter as compared with the rays through the other filter.

For the accomplishment of the first of the two purposes, I provide means for the momentary introduction in the path of one of the sets of rays of a sheet of transparent material sufficient in thickness to prolong their focusing to the same plane as that on which the other light rays will focus. While there are several ways in which this can be done, it is preferable to mount such transparent material in one segment of the rotary shutter usually employed, and to have the shutter-segments compose the two color-filters. Such transparent material is usually disposed on the green color-filter since the rays through green are the ones which usually fall short of focusing upon the film which has been focused for the red rays.

Referring to the drawings forming part of this specification, Figure 1 is a face view of a combined rotary shutter and color filter embodying my improvements. Fig. 2 is a sectional view thereof on the dotted line X—X in Fig. 1. Fig. 3 is a face view of one of the members composing the adjustable element of the shutter.

It is found that a color filter is best produced by cementing a film of colored gelatin between two sheets of glass either clear or partially stained, but preferably clear. I therefore cement to one surface of a circular sheet of glass 1 two glass segments 2 and 3, with a film of green gelatin 5 between the segment 3 and the circular sheet, and a film of red gelatin between the segment 2 and the sheet 1.

As shown in Fig. 2, the glass segment 2 is made materially thicker than the segment 3, sufficiently so to lengthen out the focal length of the rays of one color to equal that of the other rays. Consequently, as the shutter rotates between the lens and the film in the production of the photographs, or between the projecting lens and the screen in displaying the moving pictures, every time the green color filter passes the lens the extra thick segment 2 elongates the focusing length to accord with that given by the thin segment 3 to the red rays.

Since in the production as well as in the projection of film-pictures it is necessary to have the light cut off during the shiftings of the film, it is customary to provide a rotary shutter having alternating opaque and transparent segments. For color work I have found it essential to provide an adjustable shutter in order to compensate for the unequal actinic effect of the color filters; the rays of one color being generally stronger in their action on the sensitive film than the other rays. In doing this, I provide two segmental plates 6 (Fig. 3) each approximately of hour-glass shape, and rotatively adjustable on the spindle. By shifting the edge of one past the edge of the other, less space for the passage of light is permitted than would be given were the plates positioned with their edges co-extensive. This, however, merely adjusts both opposing segments equally. To unequally vary the same, a third metal plate is provided comprising a single segment 9, and a counterbalancing arm 10. All of these segmental plates are clamped in place upon the spindle 11 by a nut 12 pressing them against the shoulder 13.

To protect the glass plates from injury and especially from becoming loosened from the films and flying off, they are surrounded by a metal rim 14 embracing their edges, as shown in Fig. 2; and to counterbalance the thicker segment 2, the rim is supplied with a counterweight 15. Thus made, a rotary shutter is produced which not only regulates the amount of light permitted to pass through the color filters to equalize the light-effects upon the sensitive film or on the eye of the observer, but which causes the focusing of the sets of colored rays to accurately correspond, thereby rendering the definition and sharpness of the pictures, both as photographed and projected, to be practically perfect.

While I have described my improvements as applied for two-color work, they may equally well be employed for more complete color rendering wherein a larger number of different color filters are used.

What I claim is:

1. A motion picture device comprising means including color filters for successively directing a plurality of differently colored sets of light rays, and means for periodically operating to increase the focal length of the set of colored rays which is normally shorter than that of the others, the last-named means consisting of transparent plates of different thicknesses, the thicker plate being located over the color filter which allows rays of shorter focal length to pass and being of proper thickness to compensate for the shorter focal length of these rays.

2. A motion picture device comprising means for successively directing a plurality of differently colored sets of light rays, and a transparent plate adapted to be periodically introduced into the path of the rays having normally a shorter focal length than the remainder, said plate being of proper thickness to compensate for the shorter focal length of the rays passing through it.

3. A motion picture device comprising means for successively directing a plurality of differently colored sets of light rays, and two glass plates of different thicknesses adapted to be alternately moved into and out of the path of the rays, the glass plate of greater thickness being located in the path of the rays of shorter focal length and the last-mentioned plate being of a proper thickness to compensate for the shorter focal length of the rays passing through it.

4. A motion picture device comprising means for successively introducing two different color filters into the path of light-rays, and means for synchronously introducing into and withdrawing from said path a sheet of glass the thickness of which is proportioned for suitably lengthening the focal length of the rays through the color-filter allowing rays of shorter focal length to pass.

5. A motion picture device comprising a shutter carrying color filters differing from each other in colors, and means for rotating the shutter, a greater thickness of glass being provided for the color filter allowing rays of shorter focal length to pass, than for the other color filter such thickness being made sufficient to compensate for the shorter focal length of the rays passing through it.

6. A motion picture device comprising a circular member and means for rotating it, said member having a plurality of color filters and a plurality of glass sections of different thicknesses, the thickest section of glass being located over the color filter which allows rays of a shorter focal length to pass, the last-mentioned section being made of a proper thickness to compensate for the shorter focal length of the rays passing through it.

7. A motion picture device comprising a glass disk, two glass segments of different thicknesses, films of different colors being cemented between the segments and disk, the film allowing rays of shorter focal length to pass being between the disk and the thicker segment, said device having means for rotating it, the last-mentioned segment being of a proper thickness to compensate for the shorter focal length of the rays passing through it.

8. A motion picture device comprising a circular member and means for rotating it, said member having a plurality of color filters and a plurality of glass sections of different thicknesses, the thickest section of glass being located over the color filter which allows rays of a shorter focal length to pass, and a counterweight for the thicker sections, the thicker sections of glass being of a proper thickness to compensate for the shorter focal length of the rays passing through them.

9. A motion picture device comprising a circular glass disk, means for rotating it, glass sections cemented thereto, color filters between said disk and sections, the glass section, whose color filter allows rays of shorter focal length to pass, being thicker than the others, a metal rim encircling said disk and sections and adapted for counterbalancing the thicker glass section, the latter being of proper thickness to compensate for the shorter focal length of the rays passing through it.

10. A motion picture device comprising a glass disk and means for its rotation, glass segment of different thicknesses, films of differently colored gelatin cemented between said disk and segments, the segment of greater thickness being located over the color filter which allows rays of shorter focal length to pass and being of a proper thickness to compensate for their shorter focal length, a metal rim encircling said disk and segments, and a counterweight carried by said rim to counterbalance the thicker segment.

In testimony that I claim the foregoing invention, I have hereunto set my hand this 20th day of October, 1914.

WILLIAM H. KUNZ.

Witnesses:
A. B. UPHAM,
A. S. MOFFAT.